United States Patent
Choi et al.

(10) Patent No.: US 12,194,864 B2
(45) Date of Patent: Jan. 14, 2025

(54) BATTERY PACK, VEHICLE INCLUDING BATTERY PACK, AND METHOD FOR CONTROLLING BATTERY PACK

(71) Applicant: LG ENERGY SOLUTION, LTD., Seoul (KR)

(72) Inventors: Jee-Soon Choi, Daejeon (KR); Sang-Woo Ryu, Daejeon (KR); Gyu-Jong Bae, Daejeon (KR); Yong-Seok Choi, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 726 days.

(21) Appl. No.: 17/425,818

(22) PCT Filed: Oct. 15, 2020

(86) PCT No.: PCT/KR2020/014112
§ 371 (c)(1),
(2) Date: Jul. 26, 2021

(87) PCT Pub. No.: WO2021/096079
PCT Pub. Date: May 20, 2021

(65) Prior Publication Data
US 2022/0161659 A1 May 26, 2022

(30) Foreign Application Priority Data
Nov. 13, 2019 (KR) .................. 10-2019-0145242

(51) Int. Cl.
*B60L 3/00* (2019.01)
*B60L 3/04* (2006.01)
*B60L 50/64* (2019.01)

(52) U.S. Cl.
CPC ............ *B60L 3/0046* (2013.01); *B60L 3/0038* (2013.01); *B60L 3/04* (2013.01); *B60L 50/64* (2019.02); *B60L 2240/545* (2013.01)

(58) Field of Classification Search
CPC ........ B60L 3/0046; B60L 3/0038; B60L 3/04; B60L 50/64; B60L 2240/545;
(Continued)

(56) References Cited

U.S. PATENT DOCUMENTS 10,040,355 B2 * 8/2018 Arai .................. B60L 3/0046
2010/0033135 A1    2/2010 Nishida et al.
(Continued)

FOREIGN PATENT DOCUMENTS

CN    1016616831 A    12/2009
CN    108515846 A *   9/2018    ............ B60L 3/0046
(Continued)

OTHER PUBLICATIONS

European Search Report issued in European Patent Application No. 20 88 6347, dated Jun. 23, 2022.
(Continued)

*Primary Examiner* — Daniel S Gatewood
(74) *Attorney, Agent, or Firm* — Birch, Stewart, Kolasch & Birch, LLP

(57) ABSTRACT

A battery pack includes a battery module having a battery cell, a relay configured to connect the at least one battery module to a motor of the vehicle, and a controller connected to the relay and the motor to control the relay and the motor. When a temperature of the battery cell of the battery module rises over a predetermined temperature, the controller operates the relay so that the motor idles. The battery pack is provided to a vehicle.

10 Claims, 6 Drawing Sheets

(58) Field of Classification Search
CPC ............. B60L 2250/10; B60L 2260/22; B60L 2260/24; B60L 2260/26; B60L 58/25; B60L 58/18; B60L 58/24; B60L 3/0092; B60L 15/20; B60L 2240/42; H01M 2220/20; H01M 2010/4271; H01M 2010/4278; H01M 10/425; H01M 10/486; H01M 10/488; H01M 50/249; H01M 50/581; Y02T 10/72; Y02T 10/70; B60Y 2200/91; B60Y 2200/92
See application file for complete search history.

(56) References Cited

U.S. PATENT DOCUMENTS

| | | |
|---|---|---|
| 2010/0324762 A1 | 12/2010 | Imaseki et al. |
| 2011/0032653 A1 | 2/2011 | Jung et al. |
| 2014/0091618 A1 | 4/2014 | Jeong |
| 2015/0064514 A1 | 3/2015 | Wu et al. |
| 2015/0298557 A1 | 10/2015 | Sakata et al. |
| 2016/0254578 A1 | 9/2016 | Liu et al. |
| 2016/0276935 A1 | 9/2016 | Arai |
| 2018/0034111 A1 | 2/2018 | Hinterberger et al. |
| 2019/0299799 A1 | 10/2019 | Hinterberger et al. |
| 2019/0386350 A1 | 12/2019 | Sato |
| 2022/0161659 A1 | 5/2022 | Choi et al. |

FOREIGN PATENT DOCUMENTS

| | | | | |
|---|---|---|---|---|
| CN | 213734668 U | | 7/2021 | |
| EP | 2 695 766 A2 | | 2/2014 | |
| JP | 10-271603 A | | 10/1998 | |
| JP | 2001-103609 A | | 4/2001 | |
| JP | 2008-228518 A | | 9/2008 | |
| JP | 2011-62058 A | | 3/2011 | |
| JP | 2011062058 A | * | 3/2011 | .......... B60L 11/1853 |
| JP | 2011-182526 A | | 9/2011 | |
| JP | 2011-190690 A | | 9/2011 | |
| JP | 2015-42094 A | | 3/2015 | |
| JP | 2015042094 A | * | 3/2015 | |
| JP | 2016-584518 A | | 11/2016 | |
| JP | 2018-148726 A | | 9/2018 | |
| JP | 6469243 B2 | | 2/2019 | |
| KR | 20-1995-0015670 U | | 6/1995 | |
| KR | 19950015670 U | * | 11/1995 | |
| KR | 10-2010-0082507 A | | 7/2010 | |
| KR | 10-2014-0042597 A | | 4/2014 | |
| KR | 10-2016-0122351 A | | 10/2016 | |
| KR | 10-2017-0110678 A | | 10/2017 | |
| KR | 10-2019-0077550 A | | 7/2019 | |

OTHER PUBLICATIONS

International Search Report (PCT/ISA/210) issued in PCT/KR2020/014112, dated Jan. 27, 2021.

* cited by examiner

BATTERY PACK, VEHICLE INCLUDING BATTERY PACK, AND METHOD FOR CONTROLLING BATTERY PACK

TECHNICAL FIELD

The present application claims priority to Korean Patent Application No. 10-2019-0145242 filed on Nov. 13, 2019 in the Republic of Korea, the disclosures of which are incorporated herein by reference.

The present disclosure relates to a battery pack, a vehicle including the battery pack, and a control method of the battery pack.

BACKGROUND ART

Secondary batteries which are highly applicable to various products and exhibit superior electrical properties such as high energy density, etc. are commonly used not only in portable devices but also in electric vehicles (EVs) or hybrid electric vehicles (HEVs) driven by electrical power sources. The secondary battery is drawing attentions as a new energy source for enhancing energy efficiency and environment friendliness in that the use of fossil fuels can be reduced greatly and no byproduct is generated during energy consumption.

Secondary batteries widely used at present include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.5V. Therefore, if a higher output voltage is required, a plurality of battery cells may be connected in series to configure a battery pack. In addition, depending on the charge/discharge capacity required for the battery pack, a plurality of battery cells may be connected in parallel to configure a battery pack. Thus, the number of battery cells included in the battery pack may be variously set according to the required output voltage or the demanded charge/discharge capacity.

Meanwhile, when a plurality of battery cells are connected in series or in parallel to configure a battery pack, it is common to configure a battery module composed of at least one battery cell first, and then configure a battery pack by using at least one battery module and adding other components.

The conventional battery pack includes battery modules, each having a plurality of battery cells. Here, when an abnormal situation occurs due to expansion of a battery cell in any one battery module in an overheating situation over a predetermined temperature, if the abnormal situation is not quickly solved, thermal runaway may propagate to neighboring battery modules, which may lead to explosion or the like of the battery pack and thus cause a great danger to the user.

Therefore, when an abnormal situation occurs at a specific battery cell of the battery module in an overheating situation over a predetermined temperature, it is necessary to promptly solve the abnormal situation. In particular, it is necessary to secure safety by preventing propagation of the thermal runaway before the thermal runaway leads to neighboring the surrounding battery modules to cause explosion or fire of the battery pack.

DISCLOSURE

Technical Problem

The present disclosure is directed to providing a battery pack, which may improve the safety by preventing thermal runaway, a vehicle including the battery pack, and a control method of the battery pack.

Technical Solution

In one aspect of the present disclosure, there is provided a battery pack provided to a vehicle, comprising: at least one battery module having at least one battery cell; a relay configured to connect the at least one battery module to a motor of the vehicle; and controller connected to the relay and the motor to control the relay and the motor, wherein, when a temperature of the at least one battery cell of the at least one battery module rises over a predetermined temperature, the controller operates the relay so that the motor idles.

When the temperature of the at least one battery cell of the at least one battery module rises over the predetermined temperature, the controller may close a switch of the relay-unit.

When the temperature of the at least one battery cell of the at least one battery module rises over the predetermined temperature, the controller may shift a gear of the vehicle to a neutral mode.

The battery pack may further comprise a warning unit configured to transmit predetermined danger information to a driver of the vehicle.

When the temperature of the at least one battery cell of the at least one battery module rises over the predetermined temperature, the controller may control the warning unit to send a danger signal to the driver of the vehicle.

The controller may shift a gear of the vehicle to a neutral mode together with operating the warning unit so that the motor idles.

After a preset predetermined time passes from the operation of the warning unit, the controller may shift a gear of the vehicle to a neutral mode so that the motor idles.

The battery pack may further comprise at least one external resistor-unit configured to connect the relay and the motor.

In addition, the present disclosure provides a control method of a battery pack provided to a vehicle, comprising: shifting a gear of the vehicle to a neutral mode, when a temperature of at least one battery cell of at least one battery module rises over a predetermined temperature; operating a relay connected to the at least one battery module over the predetermined temperature; and allowing a motor of the vehicle connected to the relay to idle according to an operation of the relay.

Moreover, the present disclosure provides a vehicle comprising: at least one battery pack according to the above embodiments.

Advantageous Effects

According to various embodiments as above, it is possible to provide a battery pack, which may improve the safety by preventing thermal runaway, a vehicle including the battery pack, and a control method of the battery pack.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

FIG. 1 is a diagram for illustrating a vehicle according to an embodiment of the present disclosure.

BEST MODE

The present disclosure will become more apparent by describing in detail the embodiments of the present disclosure with reference to the accompanying drawings. It should be understood that the embodiments disclosed herein are illustrative only for better understanding of the present disclosure, and that the present disclosure may be modified in various ways. In addition, for ease understanding of the present disclosure, the accompanying drawings are not drawn to real scale, but the dimensions of some components may be exaggerated.

Figure 1:
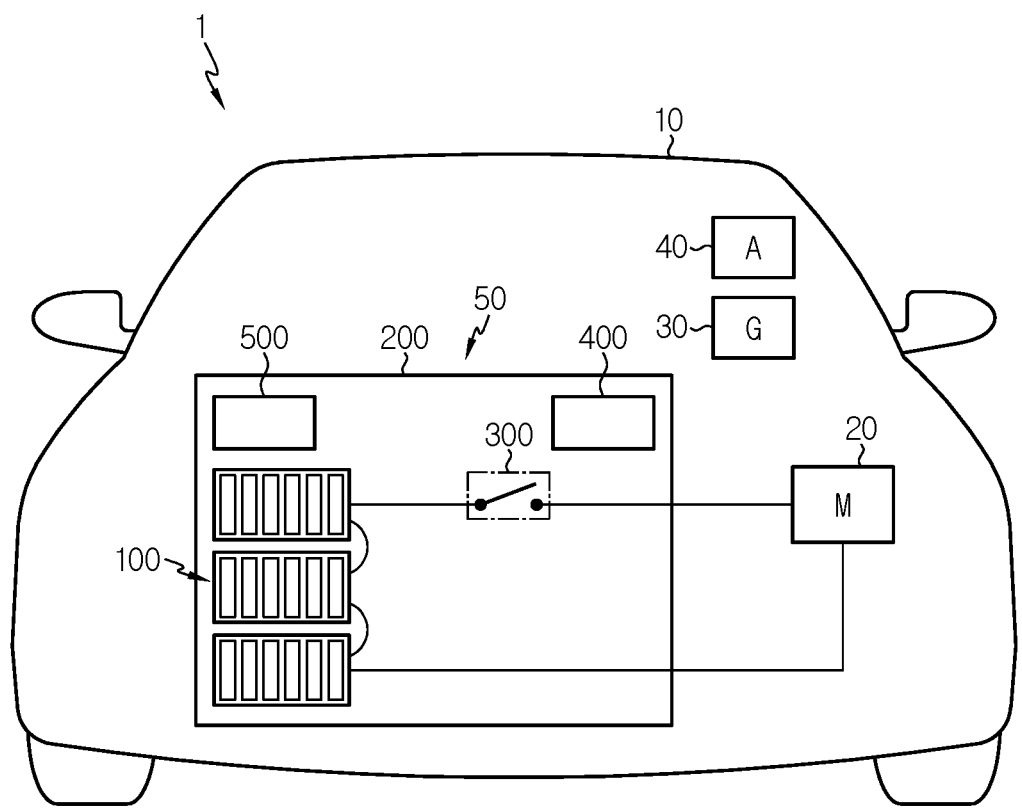
Figure 2:
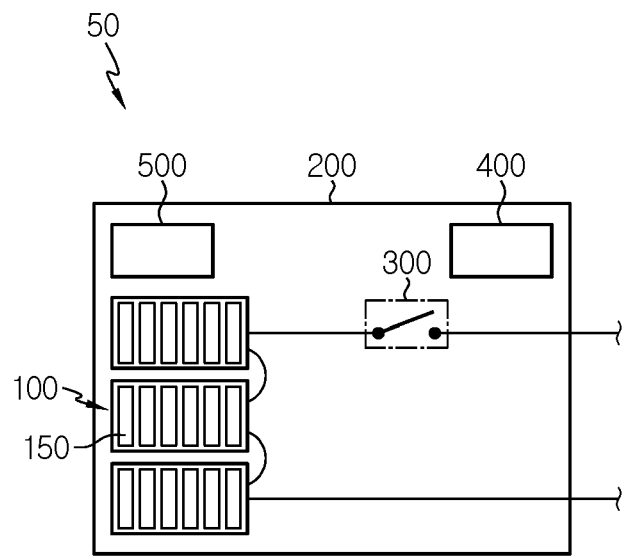
FIG. 2 is a diagram for illustrating a battery pack of the vehicle of FIG. 1.

FIG. 1 is a diagram for illustrating a vehicle according to an embodiment of the present disclosure, and FIG. 2 is a diagram for illustrating a battery pack of the vehicle of FIG. 1.

Referring to FIGS. 1 and 2, a vehicle 1 may be an electric vehicle or a hybrid electric vehicle, which includes a secondary battery as an energy source. Hereinafter, in this embodiment, the vehicle 1 will be described as an electric vehicle.

The vehicle 1 may include a body 10, a motor unit 20, a gear 30, an alarm unit 40 and a battery pack 50.

The body 10 forms an appearance of the vehicle 1 and has a driving space and a riding space for a user such as a driver, and various components of the vehicle 1 may be accommodated in or mounted to the body 10.

The motor unit 20 is for operating the vehicle 1 and the like, and may be provided to the body 10. The motor unit 20 may be connected to a gear 30 and a battery pack 50, explained later, and may be provided as an electric motor.

The gear 30 is connected to the motor unit 20 and may be shifted according to manipulation of the user such as a driver. For example, the gear 30 may be shifted to a running mode, a neutral mode, a reverse mode or a parking mode according to the user manipulation while the vehicle is running or stopped.

The alarm unit 40 is connected to warning unit 400 of the battery pack 50, explained later, and may be provided at a position that may be recognized by the user such as a driver when a danger situation occurs at the body 10.

The alarm unit 40 may be provided in the form of a display unit that provides visual information to the user to inform occurrence of the danger situation, a sound unit that provides auditory information to the user, or an audiovisual unit that provides both visual information and auditory information. The alarm unit 40 may be provided in other forms as well, without being limited to the above, as long as the user may be informed of the occurrence of the danger situation.

The battery pack 50 may be provided to the body 10 as an energy source of the vehicle 1. The battery pack 50 may provide energy for operating the motor unit 20.

The battery pack 50 may include a battery module 100, a pack case 200, a relay unit 300, a warning unit 400, and a control unit 500.

At least one battery module 100 or a plurality of battery modules 100 may be provided. Hereinafter, in this embodiment, it will be described that a plurality of battery modules 100 are provided. The plurality of battery modules 100 are electrically connected to each other and may be provided inside the pack case 200, explained later.

Each of the plurality of battery module 100 may include a battery cell 150.

The battery cell 150 is a secondary battery, and may be provided as a pouch-type secondary battery, a rectangular secondary battery, or a cylindrical secondary battery. Hereinafter, in this embodiment, the battery cell 150 will be described as a pouch-type secondary battery.

At least one battery cell 150 or a plurality of battery cells 150 may be provided. Hereinafter, in this embodiment, it will be described that a plurality of battery cells 150 are provided and stacked on each other so as to be electrically connected to each other.

The pack case 200 is mounted to the body 10, and may accommodate the plurality of battery modules 100, the relay unit 300, the warning unit 400 and the control unit 500, explained later.

The relay unit 300 is provided to the pack case 200, and may be electrically connected to the control unit 500, explained later. The relay unit 300 may connect the at least one battery module 100, or the plurality of battery modules 100 in this embodiment, to the motor unit 20 of the vehicle 1.

The warning unit 400 is for transmitting predetermined danger information to the user such as a driver of the vehicle 1, and is provided to the pack case 200. The warning unit 400 may be electrically connected to the control unit 500, explained later.

The warning unit 400 may be connected to the alarm unit 40 of the vehicle 1, and when a danger situation occurs, the warning unit 400 may provide the danger information or the like to the alarm unit 40 to guide the operation of the alarm unit 40.

The control unit 500 is provided to the pack case 200, and may be electrically connected to the motor unit 20, the gear 30 and the alarm unit 40 of the vehicle 1 to control operations of the motor unit 20, the gear 30 and the alarm unit 40.

The control unit 500 may be electrically connected to the battery module 100, the relay unit 300 and the warning unit 400 to control operations of the battery module 100, the relay unit 300 and the warning unit 400.

Hereinafter, the detailed control operation of the control unit 500 according to this embodiment will be described in more detail.

If a temperature of the at least one battery cell 150 of the at least one battery module 100 rises over a predetermined temperature, the control unit 500 may operate the relay unit 300 so that the motor unit 20 idles.

Specifically, if the temperature of the at least one battery cell 150 of the at least one battery module 100 rises over the predetermined temperature, the control unit 500 may close a switch of the relay unit 300 so that the motor unit 20 idles.

If the temperature of the at least one battery cell 150 of the at least one battery module 100 rises over the predetermined temperature, the control unit 500 may shift the gear 30 of the vehicle 1 to the neutral mode.

If the temperature of the at least one battery cell 150 of the at least one battery module 100 rises over the predetermined temperature, the control unit 500 may control the warning unit 400 to send a danger signal to the driver of the vehicle 1.

Specifically, the control unit 500 may control the warning unit 400 to transmit the danger information of the warning unit 400 to the alarm unit 40 of the vehicle 1, and control the alarm unit 40 to send the danger signal to the driver. Here, the alarm unit 40 may transmit the danger signal to the driver by emitting a light through a display or generating a horn through a speaker.

Together with operating the warning unit 400, the control unit 500 may shift the gear 30 of the vehicle 1 to the neutral mode so that the motor unit 20 idles. In addition, after a preset predetermined time passes from the operation of the warning unit 400, the control unit 500 may shift the gear 30 of the vehicle 1 to the neutral mode so that the motor unit 20 idles.

Hereinafter, the detailed operation of the battery pack 50 according to this embodiment when an abnormal situation occurs will be described in more detail.

Figure 3:
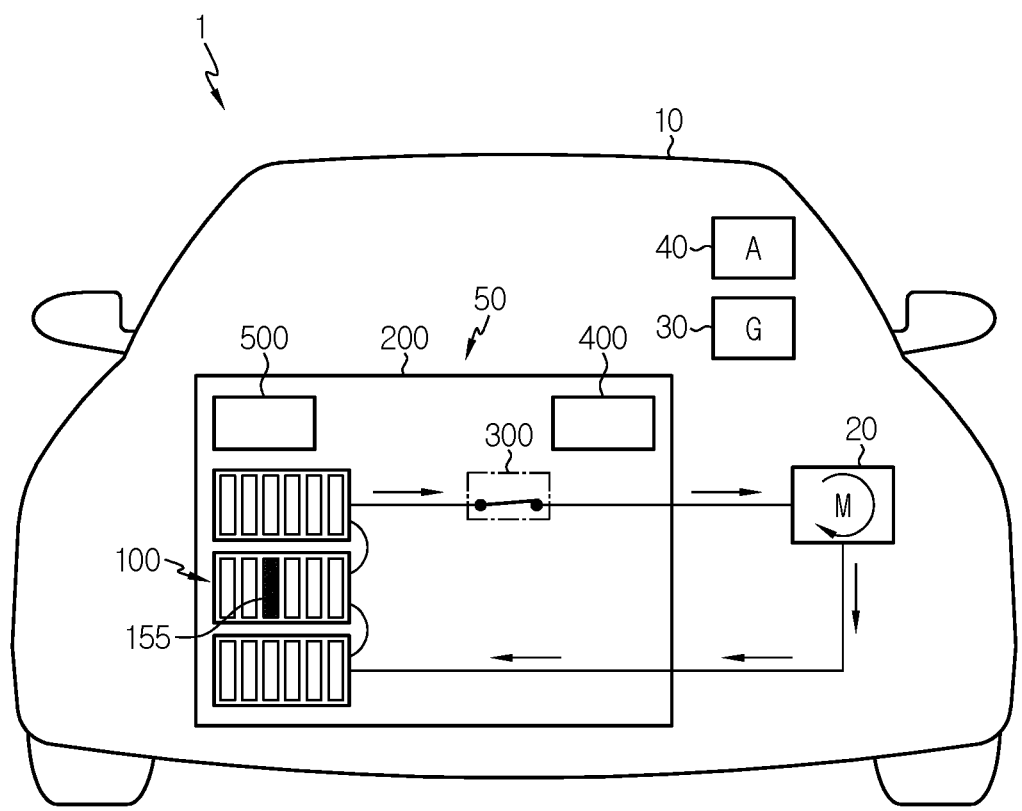
FIG. 3 is a diagram for illustrating an operation of the battery pack of FIG. 2 when an abnormal situation occurs.

FIG. 3 is a diagram for illustrating an operation of the battery pack of FIG. 2 when an abnormal situation occurs.

Referring to FIG. 3, in the battery pack 50 of the vehicle 1, an abnormal situation may occur at the battery cell 155 of the battery module 100. Specifically, in the battery cell 155 of at least one of the battery modules 100, the temperature may rise according to overheating or overcurrent.

If the temperature of the battery cell 155 keeps rising over a predetermined temperature, the battery cell 155 may be exploded or ignited, which may lead to a thermal runaway to the battery cells of the surrounding battery modules 100, resulting in an explosion of the entire battery pack or the like. In this case, a great danger may be caused the user such as a driver and an occupant of the vehicle 1.

In the battery pack 50 of this embodiment, in order to prevent this problem, when the temperature of the at least one battery cell 155 rises over the predetermined temperature, the control unit 500 may control the battery pack 50 or allow the motor unit 20 to idle in order to prevent the occurrence of thermal runaway.

Specifically, in the battery pack 50 according to this embodiment, when the temperature of the at least one battery cell 155 rises over the predetermined temperature, the control unit 500 may control the motor unit 20 to idle so that the energy level of the battery cells 155 of the battery module 100 is lowered to prevent thermal runaway. In the case of a state of charge (SOC) of the battery module 100 is at a specific SOC or below, thermal runaway does not occur, and even though thermal runaway occurs, only a small amount of heat is released. In this embodiment, the specific SOC or below may be approximately 30 percent or below.

Hereinafter, a mechanism for preventing thermal runaway according to this embodiment will be described in more detail.

If the temperature of the at least one battery cell 155 of the battery module 100 rises above the preset predetermined temperature, the control unit 500 may firstly control the warning unit 400 to notify this information to the user such as a driver of the vehicle 1 such that the user may recognize this danger situation through the alarm unit 40 of the vehicle 1.

After that, the control unit 500 may shift the state of the gear 30 of the vehicle 1 to a neutral mode. If the alarm is generated through the warning unit 400 and the gear 30 is completely shifted to the neutral mode, the control unit 500 may close the switch of the relay unit 300 to operate the relay unit 300 so that the motor unit 20 idles.

Accordingly, the energy of the battery module 100 may be converted into kinetic energy through idling of the motor unit 20 and be quickly released. Here, the idling of the motor unit 20 may be continued until the SOC is lowered to a predetermined SOC or below.

When an abnormal situation occurs due to overheating of a specific battery cell 155, the battery pack 50 according to this embodiment may effectively prevent thermal runaway of the battery cell 155 through idling of the motor unit 20 of the vehicle 1 under the control of the control unit 500, thereby significantly reducing the risk of explosion or chain ignition of the battery module 100.

Therefore, the battery pack 50 according to this embodiment may effectively prevent a large accident of such as explosion of the battery pack 50, even the vehicle 1, when an abnormal situation occurs at the specific battery cell 155.

Figure 4:
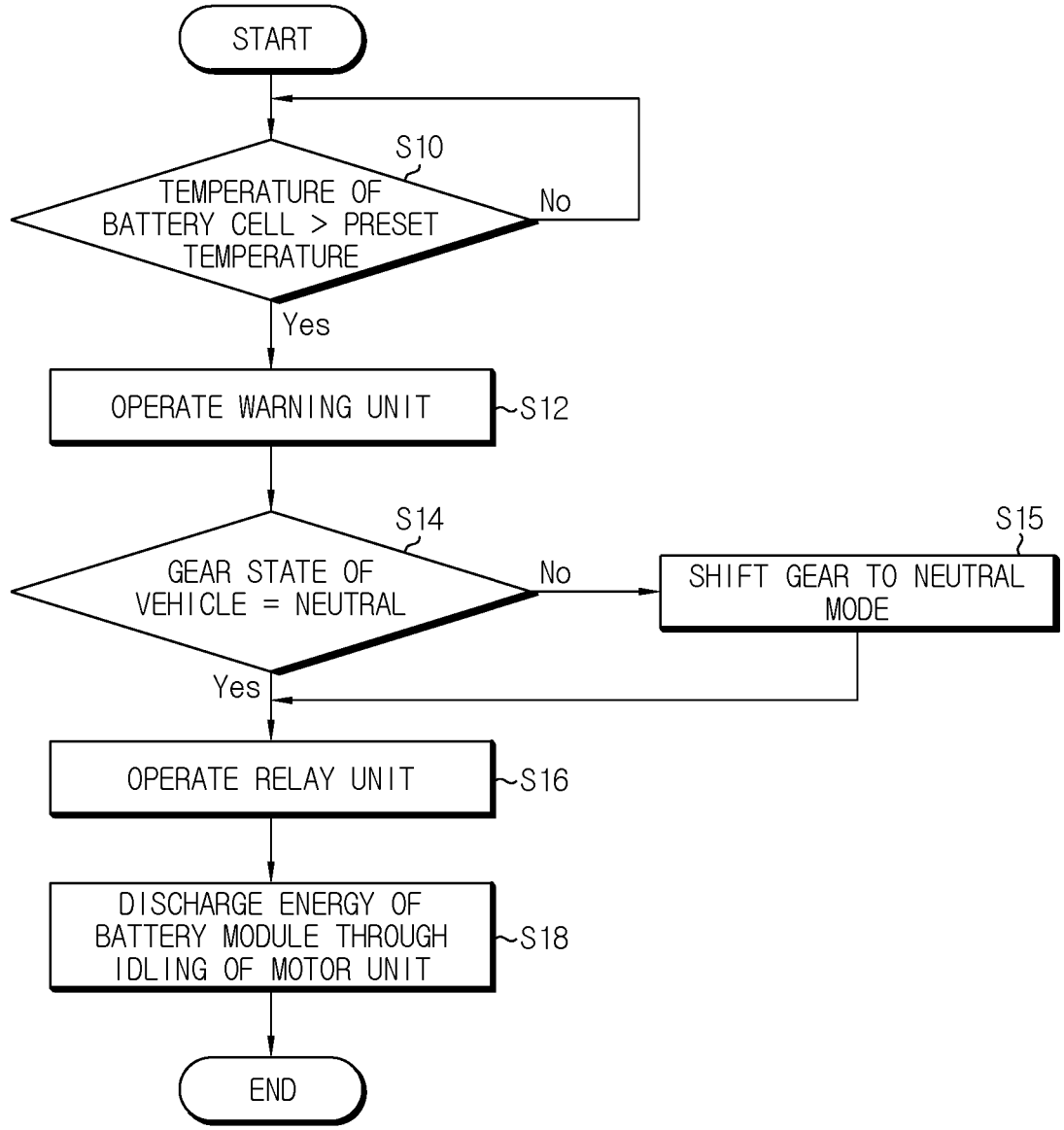
FIG. 4 is a flowchart for illustrating a control method when an abnormal situation occurs at the battery pack of FIG. 2, while the vehicle of FIG. 1 is stopped.

FIG. 4 is a flowchart for illustrating a control method when an abnormal situation occurs at the battery pack of FIG. 2, while the vehicle of FIG. 1 is stopped.

Referring to FIG. 4, when the vehicle is stopped, the control unit of the battery pack may determine whether a temperature of the battery cell of at least one battery module among the battery modules is higher than a preset temperature (S10).

If the temperature of the at least one battery cell is higher than the preset temperature, the control unit may operate the warning unit (S12) so that the user such as a driver recognizes the danger situation through the alarm unit.

The control unit may determine whether the gear of the vehicle is in a neutral state (S14), and if the gear is not in the neutral state, the control unit may shift the gear to the neutral mode (S15).

After that, the control unit may operate the relay unit by closing the switch of the relay unit (S16). Then, the control unit may convert the energy of the battery module into kinetic energy through idling of the motor unit and release the energy (S18), in order to lower the SOC of the entire battery module so that thermal runaway does not occur at the battery cell or the battery module.

Figure 5:
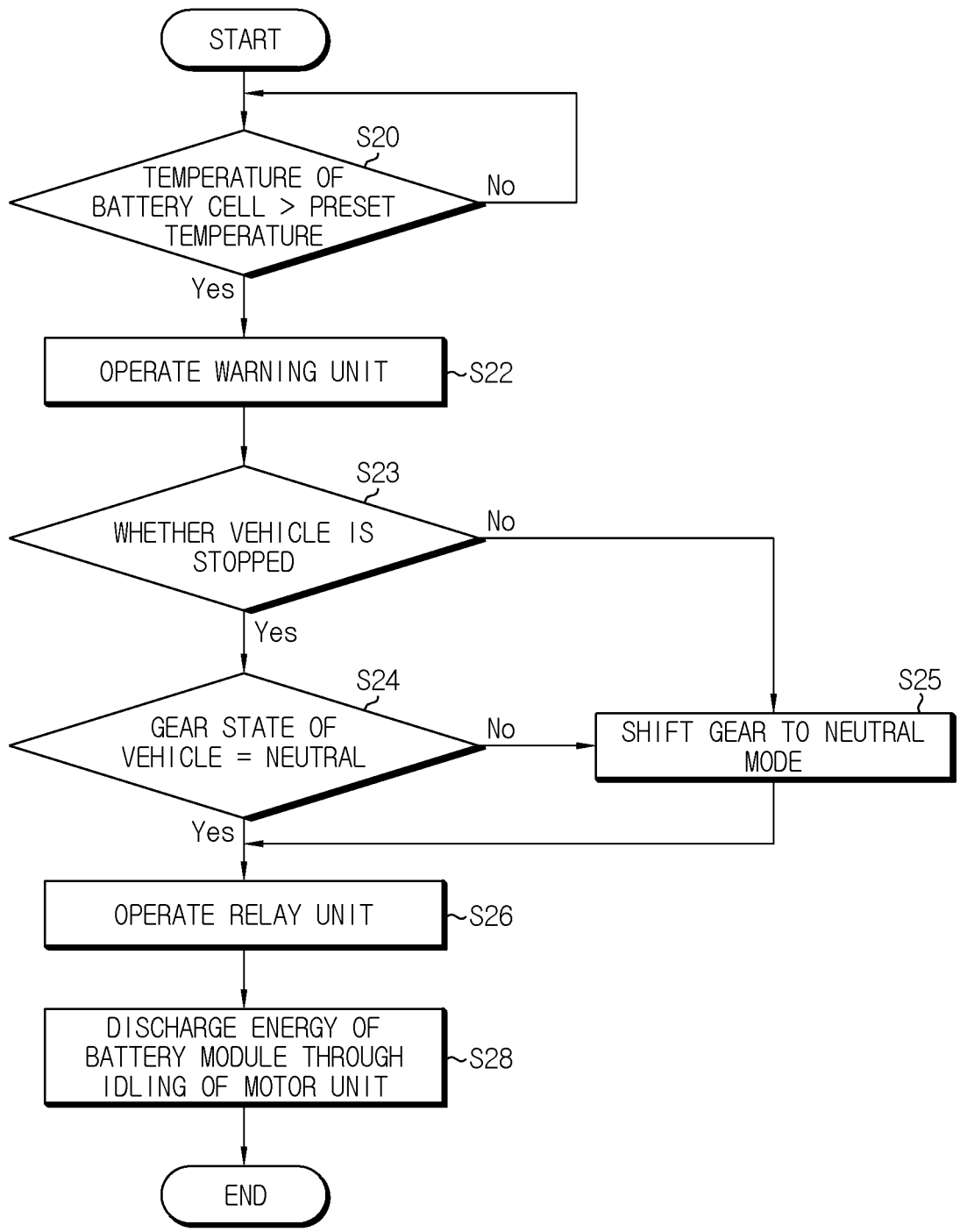
FIG. 5 is a flowchart for illustrating a control method when an abnormal situation occurs at the battery pack of FIG. 2, while the vehicle of FIG. 1 is running.

FIG. 5 is a flowchart for illustrating a control method when an abnormal situation occurs at the battery pack of FIG. 2, while the vehicle of FIG. 1 is running.

Referring to FIG. 5, when the vehicle is running, the control unit of the battery pack may determine whether a temperature of the battery cell of at least one of the battery modules is higher than a preset temperature (S20).

If the temperature of the at least one battery cell is higher than the preset temperature, the control unit may operate the warning unit (S22) so that the user such as a driver recognizes the danger situation through the alarm unit.

The control unit may determine whether the vehicle is stopped (S23). If the vehicle is in a stopped state, the control unit may determine whether the gear of the vehicle is in a neutral state (S24), and if the gear is not in the neutral state, the control unit may shift the gear to the neutral mode (S25). Meanwhile, if the vehicle is not in a stopped state but in a running state according to the determination (S23) of whether the vehicle is stopped, the control unit may shift the gear to the neutral mode.

After that, the control unit may operate the relay unit by closing the switch of the relay unit (S26). Then, the control unit may convert the energy of the battery module into kinetic energy through idling of the motor unit and release the energy (S28), in order to lower the SOC of the entire battery module so that thermal runaway does not occur at the battery cell or the battery module.

Figure 6:
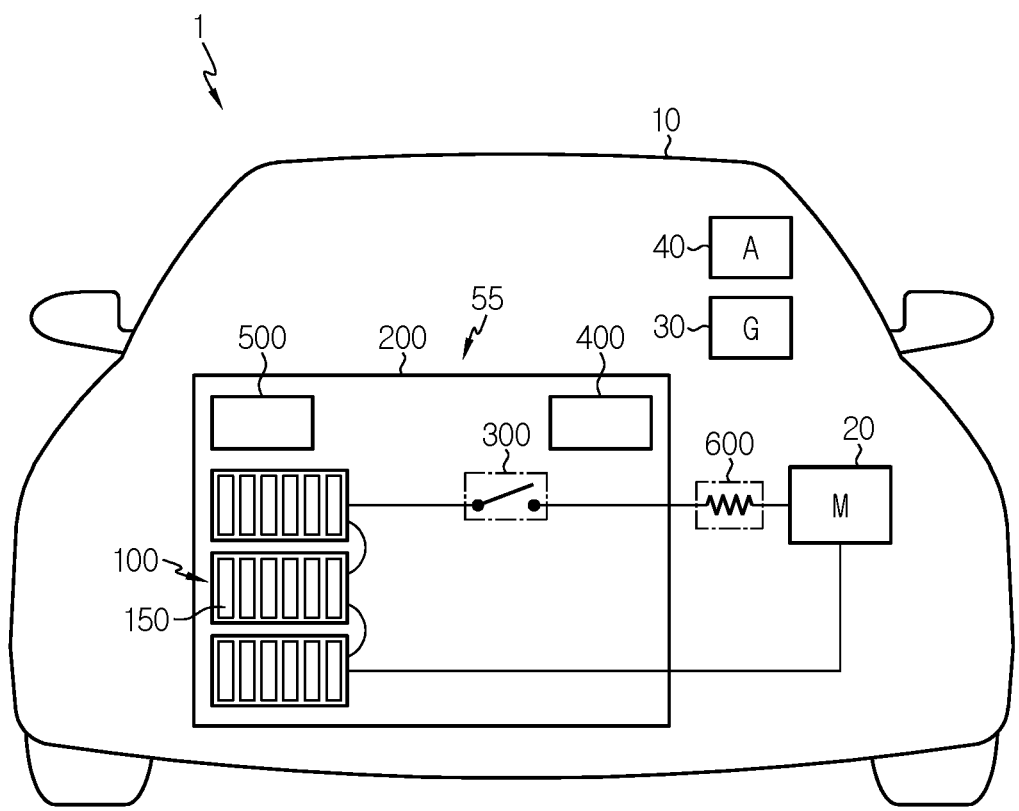
FIG. 6 is a diagram for illustrating a battery pack according to another embodiment of the vehicle of FIG. 1.
Figure 7:
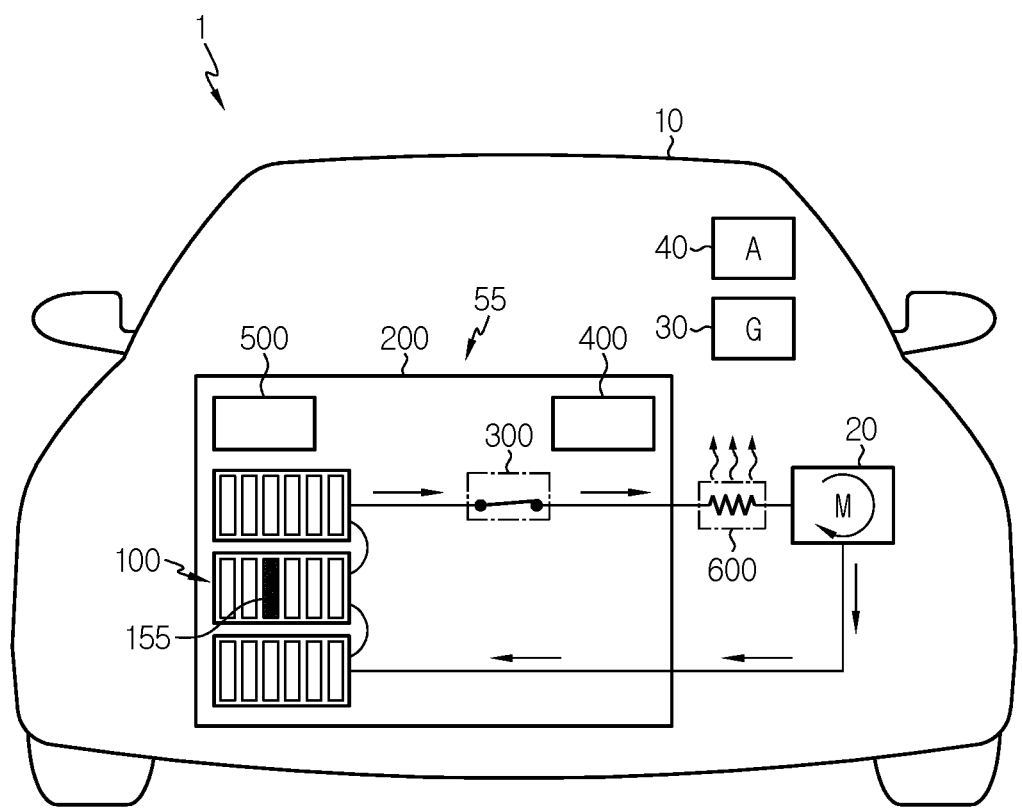
FIG. 7 is a diagram for illustrating an operation of the battery pack of FIG. 6 when an abnormal situation occurs.

FIG. 6 is a diagram for illustrating a battery pack according to another embodiment of the vehicle of FIG. 1, and FIG. 7 is a diagram for illustrating an operation of the battery pack of FIG. 6 when an abnormal situation occurs.

Since a battery pack 55 of the vehicle 1 according to this embodiment is similar to the battery pack 50 of the former embodiment, components substantially identical or similar to the former embodiment will not be described in detail, and hereinafter, features different from the former embodiment will be described in detail.

Referring to FIGS. 6 and 7, the battery pack 55 may include a battery module 100, a pack case 200, a relay unit 300, a warning unit 400, a control unit 500, and an external resistor unit 600.

The battery module 100, the pack case 200, the relay unit 300, the warning unit 400 and the control unit 500 are substantially identical or similar to the former embodiment and thus will not be described in detail.

The external resistor unit 600 is provided inside the pack case 200 or outside the pack case 200, and may connect the relay unit 300 to the motor unit 20 of the vehicle 1.

If the relay unit 300 is closed, the external resistor unit 600 may discharge the energy of the battery module 100 as thermal energy. That is, in this embodiment, when the temperature of a specific battery cell 155 of at least one of the battery modules 100 rises over a predetermined temperature due to overheating or the like, the energy of the battery module 100 may also be discharged through the external resistor unit 600 along with the energy release due to idling of the motor unit 20.

Therefore, when an abnormal situation occurs at a specific battery cell 155 of the battery module 100 due to abnormal overheating or the like, the battery pack 55 according to this embodiment may more effectively prevent the occurrence of a danger situation such as thermal runaway.

According to various embodiments as described above, it is possible to provide the battery packs 50, 55 having an improved safety by preventing thermal runaway, the vehicle 1 including the battery pack 50, 55, and the control method of the battery pack 50, 55.

While the embodiments of the present disclosure have been shown and described, it should be understood that the present disclosure is not limited to the specific embodiments described, and that various changes and modifications can be made within the scope of the present disclosure by those skilled in the art, and these modifications should not be understood individually from the technical ideas and views of the present disclosure.

REFERENCE SIGNS

1: vehicle
10: body
20: motor unit
30: gear
40: alarm unit
50, 55: battery pack
100: battery module
150, 155: battery cell
200: pack case
300: relay unit
400: warning unit
500: control unit
600: external resistor unit

What is claimed is:

1. A battery pack provided to for a vehicle, comprising:
at least one battery module having at least one battery cell;
a relay configured to connect the at least one battery module to a motor of the vehicle; and
a controller connected to the relay and the motor to control the relay and the motor,
wherein, when a temperature of the at least one battery cell of the at least one battery module rises over a predetermined temperature, the controller operates the relay so that the motor idles.

2. The battery pack according to claim 1, wherein, when the temperature of the at least one battery cell of the at least one battery module rises over the predetermined temperature, the controller closes a switch of the relay.

3. The battery pack according to claim 2, wherein, when the temperature of the at least one battery cell of the at least one battery module rises over the predetermined temperature, the controller shifts a gear of the vehicle to a neutral mode.

4. The battery pack according to claim 2, further comprising:
a warning unit configured to transmit a danger signal to a driver of the vehicle.

5. The battery pack according to claim 4, wherein, when the temperature of the at least one battery cell of the at least one battery module rises over the predetermined temperature, the controller controls the warning unit to send a danger signal to the driver of the vehicle.

6. The battery pack according to claim 5, wherein the controller shifts a gear of the vehicle to a neutral mode together with operating the warning unit so that the motor idles.

7. The battery pack according to claim 5, wherein after a preset predetermined time passes from the operation of the warning unit, the controller shifts a gear of the vehicle to a neutral mode so that the motor idles.

8. The battery pack according to claim 1, further comprising:
at least one external resistor configured to connect the relay and the motor.

9. A control method of a battery pack for a vehicle, comprising:
shifting a gear of the vehicle to a neutral mode, when a temperature of at least one battery cell of at least one battery module rises over a predetermined temperature;
operating a relay connected to the at least one battery module over the predetermined temperature; and
allowing a motor of the vehicle connected to the relay to idle according to an operation of the relay.

10. A vehicle, comprising at least one battery pack according to claim 1.

* * * * *